June 30, 1964 H. C. RESSLER 3,139,594

START STOP OSCILLATOR

Filed Oct. 31, 1961 2 Sheets-Sheet 1

INVENTOR
HUGH C. RESSLER
BY Edward V. Connors
ATTORNEY

INVENTOR
HUGH C. RESSLER
BY Edward V. Connors
ATTORNEY

United States Patent Office 3,139,594
Patented June 30, 1964

3,139,594

START STOP OSCILLATOR

Hugh C. Ressler, Bayside, N.Y., assignor to Hogan Faximile Corporation, New York, N.Y.

Filed Oct. 31, 1961, Ser. No. 149,105
10 Claims. (Cl. 331—173)

The present invention relates to electrical circuits, and more particularly to an improved start stop oscillator which is accurately controllable for starting and stopping and for providing precise timing intervals.

The start stop oscillator in accordance with the invention is particularly suitable for use in high speed facsimile recording systems in which the read-out time is of the order of one eight and a half by eleven inch page per second with a resolution of one hundred lines per inch. Such a recorder thus is able to record about one million marks or dots per second. The start stop oscillator is also suitable for use in radar installations, in which its accuracy and flexibility make it ideally suited to precise time interval measurements such as are required in radar range circuits and the like.

In a high speed facsimile recorder system electric signals carrying information are used to mark recording medium to convert the signals to visual information. The electric signals are provided by a mechanical optical scanner which transmits line-by-line information as a succession of video electric signals together with a sync pulse indicating either the start or the end of a line scan. In the recorder a plurality of styli are arranged in a line, the video signal being distributed to the various styli sequentially by means of an electronic distributor which is controlled by a start stop oscillator. In order that the recorded copy be a high quality reproduction of the original it is essential that each element of a video signal be transmitted to the proper stylus in frame and in synchronism with the rate of scan.

This has been accomplished by using a start stop synchronizing system. Upon the receipt of a start pulse from the scanner a local oscillator at the recorder is abruptly set into continuous oscillation. These oscillations act as timing pulses for the recorder electronic distributor. When the distributor has completed one scanning cycle or scanning line, a stop pulse is internally generated within the receiver which abruptly stops the local oscillator. The oscillator and the distributor then remain quiescent until the receipt of the next start pulse. In a high speed recorder capable of recording one million bits of information per second, the line scan may be of the order of one thousand per second. Thus the start stop oscillator must be started and stopped at the rate of one thousand times per second, and during its running period it must produce one thousand precisely timed oscillations. Unless the frequency stability of the start stop oscillator is relatively high, the graphic information or copy reproduced by the recorder will be distorted. Also, unless the oscillator can start and stop abruptly, distortion of the graphic information or copy reproduced by the recorder will be produced at the beginning and at the end of the scanning line.

Heretofore start stop oscillators have been used of the feedback type such as the Hartley or Colpitts and in which frequency stability is achieved only by incorporating a highly selective (high Q) resonance circuit in the oscillator tank. It is a property of such a circuit that the greater its selectivity the more sluggish is its response to a transient such as a start pulse. Observations have shown that if a Hartley or Colpitts oscillator is suddenly set into oscillation by removing a clamp from the tank circuit, the resulting transients persist for several cycles of alternation before a final uniform steady state of oscillation is obtained. In order to obtain the required high frequency stability and fast start stop capability elaborate auxiliary circuitry is necessary.

The present invention aims to overcome the difficulties and disadvantages of prior start stop oscillators by providing a blocking oscillator interconnected with a precise adjustable delay network so as to provide a start stop oscillator having both frequency stability and rapid start stop capability.

In accordance with the invention this is accomplished by the use of a blocking oscillator and a delay network in which means are provided so that the delay is controlled essentially by a single inductance and a single capacitance.

The start stop oscillator in accordance with the invention is advantageous in that the delay interval can be adjusted in length by varying either the inductance or the capacitance.

Another advantage of the start stop oscillator in accordance with the invention is that its output waveform is a sequence of short duration pulses of high rise time which are directly suitable for synchronizing control. The output from a sine wave start stop oscillator must be shaped properly before useful timing pulses are obtained but the sharp pulse output of the start-stop oscillator taught herein does not require further shaping.

Another object of the invention is to provide a start stop oscillator which is simple and economical in manufacture, dependable and accurate in operation, and rugged in use.

Other objects and advantages of the invention will be apparent from the following description and from the accompanying drawings which show, by way of examples, embodiments of the invention.

Figure 1:
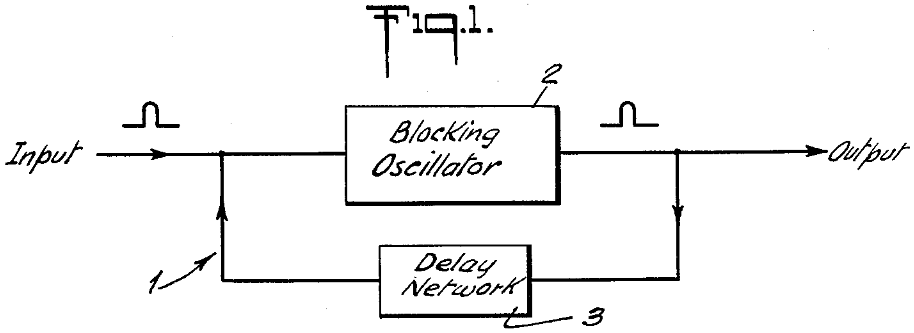
FIGURE 1 shows a block diagram of a start stop oscillator in accordance with the invention.

Referring to the drawings there is shown in FIGURE 1 a start stop oscillator in accordance with the invention and including a conventional blocking oscillator circuit 2 provided with a regenerative feedback loop including a delay network 3 which introduces a delay $t_0$ between its output and input terminals.

Figure 2:
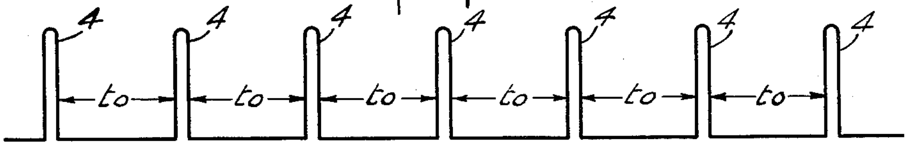
FIGURE 2 shows the waveform of the start stop oscillator in accordance with the invention.

The circuit of FIGURE 1 remains quiescent until a pulse is applied to the input of the blocking oscillator 2 which then fires and the resulting output pulse is fed into the input $t_0$ seconds later so as to maintain the blocking oscillator 2 in oscillation to produce a continuous series of pulses 4 separated by $t_0$ seconds as illustrated in FIGURE 2.

The delay lines which have been commonly used for this purpose have been temperature sensitive and thus the output of the blocking oscillator has varied with temperature. Further, such delay lines have not been easily adjustable as to the length of the delay interval. Thus the pulse repetition frequency has not been readily adjustable as is required in some applications.

Figure 3:
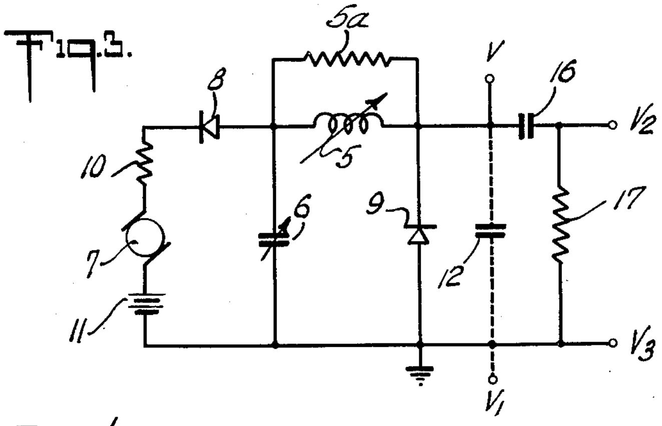
FIGURE 3 is a schematic drawing of a control circuit in accordance with the invention for use with a blocking oscillator.

In the delay circuit, shown schematically in FIGURE 3, an inductance 5 having a damping resistance 5*a*, and a capacitance 6 are the elements used for producing the delay interval $t_0$. This interval may be adjusted in length by varying either the inductance 5 or the capacitance 6.

Basically this delay assembly is as stable and adjustable as a conventional resonant circuit employed in conventional oscillator circuits.

In the delay circuit illustrated in FIGURE 3 a generator 7 is adapted to supply a short duration negative pulse to the network including like diodes 8 and 9, the inductance 5, and the capacitance 6. The internal resistance of the generator 7 is represented by the resistance 10. A battery or other direct current supply 11 producing a voltage E is connected in series with the generator 7 so that the diodes 8 and 9 are back biased. The distributed capacitance of the output circuit is indicated at 12.

Figure 4:
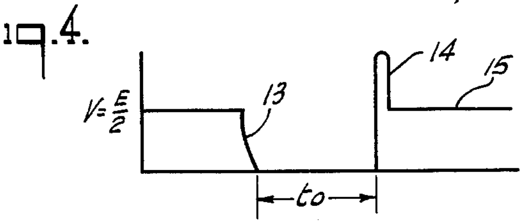
FIGURE 4 shows a waveform of the output of the delay network.

Under quiescent conditions in the absence of a pulse from the generator 7, the output potential $V—V_1$ is roughly one half of the battery voltage $(E/2)$ (FIGURE 4) as the diodes 8 and 9 are of the same type. Upon the tential at $V—V_1$ as indicated at 13 (FIGURE 4). At the application of a negative pulse in amplitude exceeding the battery voltage E, the diode 8 conducts and the capacitance 6 is rapidly charged to the pulse amplitude level. During this phase while the capacitance 6 is being charged, the diode 9 begins to conduct lowering the potential at $V—V_1$ as indicated at 13 (FIGURE 4). At the time the input pulse disappears the generator 7 is isolated from the remainder of the circuit by the back biased diode 8 and the energy stored in the capacitance 6 discharges through the series circuit including the inductance 5, its distributed capacitance and the diode 9.

Since the initial direction of current flow is such as to make the diode 9 act as a low resistance short circuit, the series circuit behaves as a high Q series resonant circuit and executes a one half cycle damped oscillation. At the end of this half cycle the energy is stored in the inductance 5 and as the voltage reverses the diode 9 immediately becomes a high resistance. The circuit now executes a damped oscillation 14 at a very much higher frequency depending upon the stray circuit capacitance 12 and that of the inductance 5. By proper selection of the inductance 5, this later oscillation can be made much higher than the LC resonant frequency and the voltage $V—V_1$ indicated at 15, rapidly assumes its quiescent level.

The time interval $t_0$ is given by the formula $t_0=\pi\sqrt{LC}$.

Figure 5:
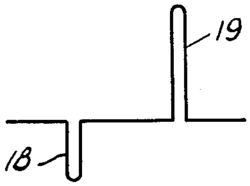
FIGURE 5 shows the waveform of FIGURE 4 after it has been differentiated.

The output voltage $V—V_0$ may be differentiated by the network including capacitance 16 and resistance 17, the differentiated voltage being $V_2—V_3$, the waveform of the output $V_2—V_3$ is shown in FIGURE 5, the negative going pulse 18 is approximately coincident with the input pulse while the positive going pulse 15 (FIGURE 4) is delayed by the time interval $t_0$. The delay introduced is thus seen to depend only upon the stable circuit elements, the inductance 5 and the capacitance 6, and the delay interval can be controlled by varying the values of either element.

Inasmuch as the output from the plate of a shunt excited vacuum tube blocking oscillator is a negative pulse, and the required input trigger to fire it must be a positive pulse, the delay network with the differentiated output $V_2—V_3$ may be connected in the feedback path and pulses of the proper polarity are generated to produce a continuous stream of output pulses in the blocking oscillator circuit, the repetition rate being given by the formula:

$$\text{pulse repetition frequency}=\frac{1}{\pi\sqrt{LC}}$$

Figure 6:
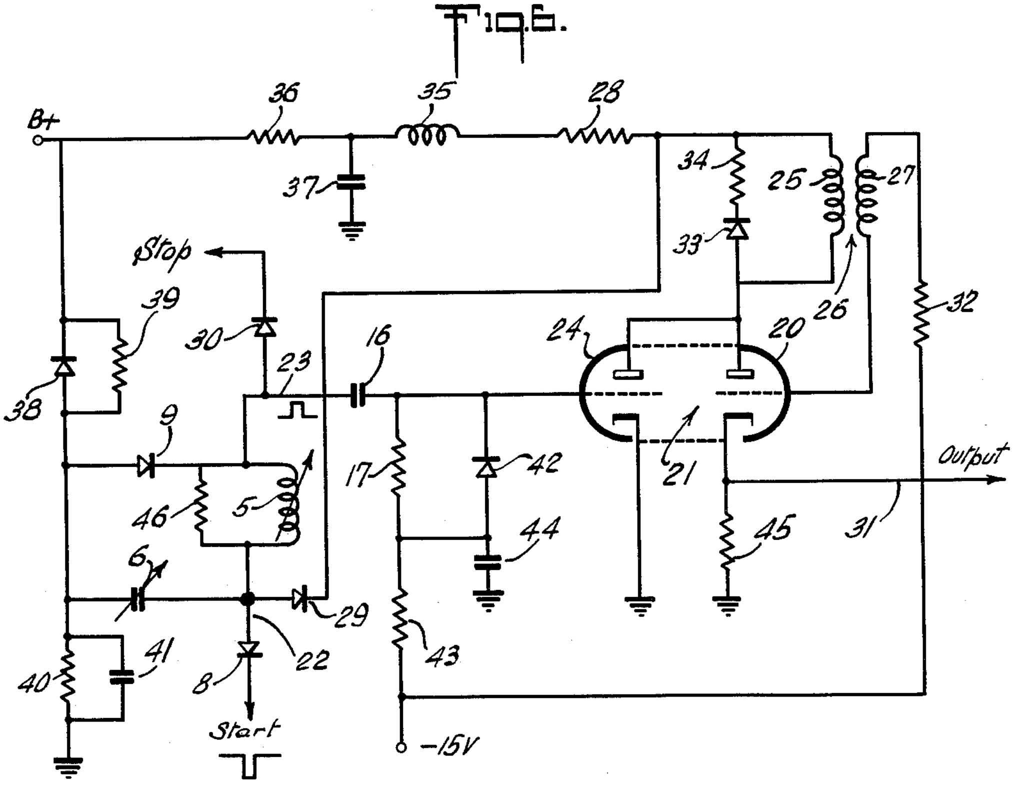
FIGURE 6 is a schematic drawing of a commercial embodiment of a start stop oscillator in accordance with the invention.

In FIGURE 6 there is shown a schematic circuit diagram of a start stop oscillator in accordance with the invention and which is particularly suitable for use in the electronic distributor circuit of a high speed facsimile recorder. In this circuit it is more convenient to reference the potentials to the B plus voltage rather than to ground. In this circuit the operation of the start stop oscillator is started by a start pulse and stopped by a stop pulse both of which are provided by other circuitry known in the art.

The operation of the circuit of FIGURE 6 is as follows: Under quiescent conditions blocking oscillator triode 20 of the twin triode 21 is in the cutoff condition due to the applied grid bias and no output pulses are generated. When a negative starting pulse is applied at input 22 of the delay network, a positive pulse appears at its output 23 of the delay network, and is applied through differentiating network including the capacitor 16 and the resistor 17 to the grid of triggering section 24 of the twin triode 21. Inasmuch as the plates of the triodes 20 and 24 are connected in shunt, a negative pulse is applied to primary 25 of the pulse transformer 26. A positive pulse is applied to the grid of the oscillator section 20 from secondary 27 of the pulse transformer 26. The oscillator section 20 is fired and a large negative pulse is developed across resistor 28 which is applied to the input 22 of the delay network through the diode 29.

It should be noted that the first driving pulse applied through the diode 29 is delayed relative to the starting pulse applied through the diode 8 by the delay introduced by the network. The sequence of delayed pulses applied through the diode 29 maintains the circuit in oscillation until a stop pulse is applied through the diode 30. At the output 31 of the start stop oscillator is produced a series of narrow timing spike-like pulses as shown at 4 in FIGURE 2.

In the circuit shown in FIGURE 6 resistor 32 is a grid current limiting resistance. Diode 33 and resistor 34 permit the development of only negative pulses across the primary 25 of the pulse transformer 26. Inductance 35 improves the rise time of the output pulse. Resistor 36 and capacitor 37 decouple the pulses from the B plus supply. Diode 38, resistors 39 and 40, and capacitor 41 are to reference the potential to B plus and provide the required back bias for diodes 8, 9, and 29. Diode 42 is to restore the direct current component to the trigger pulse. Resistor 43 and capacitor 44 form a decoupling network for the grid of the trigger section 24. A resistor 45 is in the cathode-ground circuit of the oscillator section 20 and a resistor 46 is connected across the inductance 5. The value of the resistor 46 is usually chosen to provide critical damping of the coil 5 at its self resonant frequency.

A start-stop oscillator manufactured commercially and found to operate in a satisfactory manner employed constants for the electric components as follows:

| | |
|---|---|
| Inductance **5** | 200–500 microhenries. |
| Capacitance **6** | 390 microfarads. |
| Diode **8** | 1N484. |
| Diode **9** | 1N484. |
| Capacitance **16** | 56 micro-microfarads. |
| Resistance **17** | 10K ohms. |
| Twin triode **21** | Type 5687. |
| Pulse transformer **26** | PT 100. |
| Resistance **28** | 825 ohms. |
| Diode **29** | 1N484. |
| Diode **30** | 1N96. |
| Resistance **32** | 47 ohms. |
| Diode **33** | 1N38A. |
| Resistance **34** | 560 ohms. |
| Inductance **35** | 47 microhenries. |
| Resistance **36** | 180 ohms. |
| Capacitance **37** | .01 microfarad. |
| Diode **38** | 1N1527. |
| Resistance **39** | 3.9K ohms. |
| Resistance **43** | 180 ohms. |
| Capacitance **44** | .01 microfarad. |
| Resistance **45** | 180 ohms. |
| Resistance **46** | 39K ohms. |

While the invention has been described and illustrated with reference to a specific embodiment thereof, it will be understood that other embodiments may be resorted to without departing from the invention. Therefore, the forms of the invention set out above should be considered as illustrative and not as limiting the following claims.

I claim:

1. A start stop oscillator comprising an oscillator, triggering means for the oscillator, a delay network feedback coupling the output of the oscillator to the input of the triggering means, the delay network including an inductance, an electronic switch connected in series with the inductance, a capacitance connected across the series connected inductance and switch, the electronic switch operative to discharge the capacitance into the inductance and to prevent a back oscillation from the inductance to the capacitance, and output means connected from the inductance to the triggering means, whereby a delayed feedback pulse maintains the oscillator in oscillation.

2. A start stop oscillator comprising an oscillator normally biased in the non-oscillatory state, triggering means for starting the oscillator, a delay network feedback coupling the output of the oscirlator to the input of the triggering means, the delay network including an inductance, an electronic switch connected in series with the inductance, a capacitance connected across the series connected inductance and switch, means supplying a pulse to charge the capacitance, the electronic switch operative to discharge the capacitance into the inductance and to prevent a back oscillation from the inductance to the capacitance, and output means connected from the inductance to the triggering means, whereby a delayed feedback pulse maintains the oscillator in oscillation.

3. A start stop oscillator comprising an oscillator, triggering means for the oscillator, a delayed network feedback coupling the output of the oscillator to the input of the triggering means, the delayed network including an inductance, an electronic switch connected in series with the inductance, a capacitance connected across the series connected inductance and switch, the electronic switch operative to discharge the capacitance into the inductance and to prevent a back oscillation from the inductance to the capacitance, output means connected from the inductance to the triggering means, whereby a delayed feedback pulse maintains the oscillator in oscillation, and means supplying a pulse of opposite polarity to said delaped pulse to stop oscillation of the oscillator.

4. A start stop oscillator comprising an oscillator normally biased in the non-oscillatory state, triggering means for starting the oscillator, a delay network feedback coupling the output of the oscillator to the input of the triggering means, the delay network including an inductance, an electronic switch connected in series with the inductance, a capacitance connected across the series connected inductance and switch, means supplying a pulse to charge the capacitance, the electronic switch operative to discharge the capacitance into the inductance and to prevent a back oscillation from the inductance to the capacitance, output means connected from the inductance to the triggering means, whereby a delayed feedback pulse maintains the oscillator in oscillation, and means supplying a pulse of opposite polarity to said delayed pulse to stop oscillation of the oscillator.

5. A start stop oscillator comprising an oscillator, triggering means for the oscillator, a delay network feedback coupling the output of the oscillator to the input of the triggering means, the triggering means and the oscillator being coupled through a twin triode, the delay network including an inductance, an electronic switch connected in series with the inductance, a capacitance connected across the series connected inductance and switch, the electronic switch operative to discharge the capacitance into the inductance and to prevent a back oscillation from the inductance to the capacitance, and output means connected from the inductance to the triggering means, whereby a delayed feedback pulse maintains the oscillator in oscillation.

6. A start stop oscillator comprising an oscillator, triggering means for the oscillator, a delay network feedback coupling the output of the oscillator to the input of the triggering means, the delay network including an inductance, a damping resistance connected across the inductance, an electronic switch connected in series with the inductance, a capacitance connected accross the series connected inductance and switch, the electronic switch operative to discharge the capacitance into the inductance and to prevent a back oscillation from the inductance to the capacitance, and output means connected from the inductance to the triggering means, whereby a delayed feedback pulse maintains the oscillator in oscillation.

7. A start stop oscillator comprising a twin triode including triggering and oscillator sections, both sections including plates and cathodes, said plates connected in parallel, the triggering section cathode grounded directly, the oscillator section cathode grounded through a resistance, the ungrounded side of the resistor providing the output of the start stop oscillator, a delay network, a pulse transformer having a first winding connected in series with the plate circuit and the input of the delay network, a second winding of the pulse transformer connected in series between the oscillator section grid and a bias, a source of plate potential connected to the first winding of the pulse transformer, the delay network including an inductance, a diode connected in series with the inductance, a capacitance connected across the series connected diode and inductance, the diode operative to discharge the capacitance into the inductance and to prevent a back oscillation from the inductance to the capacitance, delay network output means connected from between the inductance and the diode to the grid of the triggering section of the twin triode, delay network input means connected from between the pulse transformer first winding and the source of plate potential to the other side of the inductance, means providing a start pulse connected to the delay network input, and means providing a stop pulse connected to the delay network output.

8. A start stop oscillator comprising a twin triode including triggering and oscillator sections, both sections including plates and cathodes, said plates connected in parallel, the triggering section cathode grounded directly, the oscillator section cathode grounded through a resistance, the ungrounded side of the resistor providing the output of the start stop oscillator, a delay network, a pulse transformer having a first winding connected in series with the plate circuit and the input of the delay network, a second winding of the pulse transformer connected in series between the oscillator section grid and a bias, a source of plate potential connected to the first winding of the pulse transformer, the delay network including an inductance, a diode connected in series with the inductance, a capacitance connected across the series connected diode and inductance, the diode operative to discharge the capacitance into the inductance and to prevent a back oscillation from the inductance to the capacitance, delay network output means connected from between the inductance and the diode to the grid of the triggering section of the twin triode, delay network input means connected from between the pulse transformer first winding and the source of plate potential to the other side of the inductance, means including a second diode providing a start pulse connected to the delay network input, and means including a third diode providing a stop pulse connected to the delay network output.

9. A start stop oscillator comprising a twin triode including triggering and oscillator sections, both sections including plates and cathodes, said plates connected in parallel, the triggering section cathode grounded directly, the oscillator section cathode grounded through a resistance, the ungrounded side of the resistor providing the output of the start stop oscillator, a delay network, a pulse transformer having a first winding connected in series with the plate circuit and the input of the delay network a second winding of the pulse transformer connected in series between the oscillator section grid and a bias, a source of plate potential connected to the first winding of the pulse transformer, a second inductance and a resistance connected in series with the plate potential, the delay network including an inductance, a diode connected in series with the inductance, a capacitance connected across the series connected diode and inductance, the diode operative to discharge the capacitance into the inductance and to prevent a back oscillation from the inductance to the capacitance, delay network output means connected from between the inductance and the diode to the grid of the triggering section of the twin triode, delay network input means connected from between the pulse transformer first winding and the source of plate potential to the other side of the inductance, means including a second diode providing a start pulse connected to the delay network input, and means including a third diode providing a stop pulse connected to the delay network output.

10. A start stop oscillator comprising an oscillator, triggering means for the oscillator, a delay network feedback coupling the output of the oscillator to the input of the triggering means, the delay network including an inductance, a diode connected in series with the inductance, a capacitance connected across the series connected inductance and diode, the diode operative to discharge the capacitance into the inductance and to prevent a back oscillation from the inductance to the capacitance, and output means connected from the inductance to the triggering means, whereby a delayed feedback pulse maintains the oscillator in oscillation.

References Cited in the file of this patent

UNITED STATES PATENTS

| | | |
|---|---|---|
| 2,697,166 | MacNichol et al. | Dec. 14, 1954 |
| 2,919,437 | Buie et al. | Dec. 29, 1959 |
| 2,985,845 | Anderson et al. | May 23, 1961 |